(12) United States Patent
Freeman et al.

(10) Patent No.: US 10,560,683 B2
(45) Date of Patent: Feb. 11, 2020

(54) SYSTEM, METHOD AND SOFTWARE FOR PRODUCING THREE-DIMENSIONAL IMAGES THAT APPEAR TO PROJECT FORWARD OF OR VERTICALLY ABOVE A DISPLAY MEDIUM USING A VIRTUAL 3D MODEL MADE FROM THE SIMULTANEOUS LOCALIZATION AND DEPTH-MAPPING OF THE PHYSICAL FEATURES OF REAL OBJECTS

(71) Applicant: Maxx Media Group, LLC, Philadelphia, PA (US)

(72) Inventors: Richard S. Freeman, Philadelphia, PA (US); Scott A. Hollinger, Philadelphia, PA (US)

(73) Assignee: Maxx Media Group, LLC, Philadelphia, PA (US)

( * ) Notice: Subject to any disclaimer, the term of this patent is extended or adjusted under 35 U.S.C. 154(b) by 46 days.

(21) Appl. No.: 15/903,021

(22) Filed: Feb. 22, 2018

(65) Prior Publication Data

US 2018/0192032 A1  Jul. 5, 2018

Related U.S. Application Data

(63) Continuation-in-part of application No. 15/481,447, filed on Apr. 6, 2017, now Pat. No. 10,136,121.
(Continued)

(51) Int. Cl.
*H04N 13/239* (2018.01)
*G06T 7/50* (2017.01)
(Continued)

(52) U.S. Cl.
CPC ............ *H04N 13/239* (2018.05); *G06T 7/50* (2017.01); *G06T 15/205* (2013.01); *G06T 19/20* (2013.01); *H04N 13/275* (2018.05)

(58) Field of Classification Search
CPC ............... H04N 19/597; H04N 13/128; H04N 2013/0081; H04N 13/271; H04N 13/261;
(Continued)

(56) References Cited

U.S. PATENT DOCUMENTS

| | | | |
|---|---|---|---|
| 3,723,904 A | 3/1973 | Bernier | |
| 5,790,284 A | 8/1998 | Taniguchi et al. | |

(Continued)

FOREIGN PATENT DOCUMENTS

WO    WO 2017/009324    1/2017

*Primary Examiner* — Haixia Du
(74) *Attorney, Agent, or Firm* — LaMorte & Associates, P.C.

(57) ABSTRACT

A method of producing vertically or forward projecting three-dimensional images using virtual 3D models, wherein said 3D models are created by the simultaneous localization and depth-mapping of the physical features of real objects. A camera is used to take a first image from a first perspective, and a subsequent image from a subsequent perspective, wherein the autofocus system provides a first set of depth mapping data and a subsequent set of depth mapping data. The first set of depth mapping data and the subsequent set of depth mapping data are used to generate a disparity mapping. A virtual 3D model is created from the disparity mapping. The virtual 3D model is imaged to obtain images that can be viewed as three-dimensional. Enhanced 3D effects are added to the virtual 3D model that cause aspects of the image to appear to extend above, or in front of, the display medium.

18 Claims, 12 Drawing Sheets

Related U.S. Application Data

(60) Provisional application No. 62/319,788, filed on Apr. 8, 2016.

(51) Int. Cl.
  *G06T 15/20* (2011.01)
  *G06T 19/20* (2011.01)
  *H04N 13/275* (2018.01)

(58) Field of Classification Search
  CPC . G06T 17/00; G06T 2207/10012; G06T 7/55; G06T 2207/10021; G06T 5/50; G06T 7/593; G06T 7/557; G06T 7/50
  See application file for complete search history.

(56) References Cited

U.S. PATENT DOCUMENTS

| | | |
|---|---|---|
| 6,121,972 A | 9/2000 | Takahashi et al. |
| 6,614,427 B1 | 9/2003 | Aubrey |
| 6,657,998 B2 | 12/2003 | Li |
| 7,364,300 B2 | 4/2008 | Favalora et al. |
| 7,589,759 B1 | 9/2009 | Freeman et al. |
| 7,729,541 B2 | 6/2010 | Razdan et al. |
| 8,330,801 B2 | 12/2012 | Wang et al. |
| 2008/0079660 A1* | 4/2008 | Fukushima .......... H04N 13/275 345/7 |
| 2010/0182406 A1* | 7/2010 | Benitez ................ G06T 7/55 348/46 |
| 2011/0063420 A1 | 3/2011 | Masuda |
| 2011/0096832 A1 | 4/2011 | Zhang et al. |
| 2012/0033043 A1 | 2/2012 | Han |
| 2012/0263372 A1 | 10/2012 | Adachi |
| 2012/0314934 A1* | 12/2012 | Kudo .................. G06F 3/04845 382/154 |
| 2014/0111627 A1 | 4/2014 | Ishigami |
| 2015/0213588 A1 | 7/2015 | Wang et al. |
| 2017/0004651 A1* | 1/2017 | Xiong .................. G06F 1/1605 |

* cited by examiner

SYSTEM, METHOD AND SOFTWARE FOR PRODUCING THREE-DIMENSIONAL IMAGES THAT APPEAR TO PROJECT FORWARD OF OR VERTICALLY ABOVE A DISPLAY MEDIUM USING A VIRTUAL 3D MODEL MADE FROM THE SIMULTANEOUS LOCALIZATION AND DEPTH-MAPPING OF THE PHYSICAL FEATURES OF REAL OBJECTS

RELATED APPLICATIONS

This application is a continuation-in-part of co-pending U.S. patent application Ser. No. 15/481,447, filed Apr. 6, 2017, which claims benefit of U.S. Provisional Application No. 62/319,788 filed Apr. 8, 2016.

BACKGROUND OF THE INVENTION

1. Field of the Invention

In general, the present invention relates to systems, methods, and software that are used to create virtual stereoscopic and/or auto-stereoscopic images using virtual 3D models, wherein the 3D models are created by the simultaneous localization and depth-mapping of the physical features of real objects. More particularly, the present invention relates to systems, methods and software that create virtual images that appear to extend above, or in front of, the display being viewed.

2. Prior Art Description

Only a few decades ago, cameras were dedicated devices. The camera had an objective lens that had to be pointed toward the object that was being imaged. The objective lens then had to be manually focused at that object. As technology progressed, cameras were developed that had the ability to focus automatically. That is, the camera would automatically focus on a targeted object in front of the camera. Autofocusing was typically accomplished using a time of flight system. In a time of flight system, an emitter such as an infrared light source, shines a beam of infrared light in the direction that the camera lens is pointed. The infrared light would then travel to the object and is reflected back toward the camera. The camera contains an infrared sensor that captures the reflected infrared light in the frequency range used by the emitter. By sensing the time of flight of the emitted energy between transmission and reception, the distance of the object can be calculated. This information is then used to automatically focus the lens of the camera.

The cameras that many people use today are not dedicated devices. Rather, cameras have been integrated into handheld smart phones and tablet computers. As such, any person who carries a smart phone also carries a camera. The cameras used on smart phones and tablet computers have small objective lenses. Furthermore, these objective lenses cannot be manually focused. As such, cameras on smart phones must rely upon autofocus systems to capture clear images.

Although time of travel systems can still be used to determine the distance an object is from the camera for autofocus purposes, more useful information is typically obtained using depth mapping. In a smart phone, basic depth mapping is commonly achieved using a structured light system. In a structured light system, an infrared light pattern, such as a grid, is projected onto an object in front of the camera. Since the grid pattern is emitted in the infrared, the grid pattern is not visible to the naked eye. The projected grid pattern is distorted by the shape of the object it hits. Using the processing power available within a smart phone or tablet, the distortions in the grid pattern can be converted into a depth map that represents the shape of the targeted object. The depth map is a map or per-pixel data containing depth-related information, which corresponds to the physical shape of the object being mapped. Accordingly, depth values are assigned to units of per-pixel data. This data can then be used to create an accurate three-dimensional model of the object being mapped.

Some smart phones have two cameras that are set into a stereoscopic pair. Some depth mapping can be easily achieved using stereoscopic cameras by comparing the left/right images and calculating the distance between various points on the object and the cameras. Such a system is used by Google® in its "Project Tango" stereoscopic depth mapping system. However, most smart phones only have a single camera or a single camera on the screen side of the smartphone that is used to take selfies. A smart phone may contain one or more infrared emitters. The infrared emitters are used for the autofocusing system or are used for a dedicated depth mapping system, such as in the Apple iPhone X depth mapping system. However, obtaining an accurate depth map from a single camera point is complex. With a single camera, the infrared time of travel system and/or a structured light system is used to obtain depth data regarding a single image. A disparity map is then generated by comparing normalized shift values in successive images. In many modern smart phones, disparity maps are generating using a simultaneous localization and mapping (SLAM) software. SLAM software tracks a set of targeted pixel points through successive camera frames and uses these tracks to triangulate a positional coordinate in real space. Simultaneously, the estimated positions in real space are used to calculate the camera positions which could have observed them.

When the camera of a smart phone is turned on, it does not have two different images with which to calculate distances. However, once two images are taken in succession, data becomes available. Furthermore, additional data can be obtained from the smart phone using the accelerometer sensors of the smart phone that can be used to estimate changes in camera position between the first image and a subsequent image. Accordingly, the optical differences between subsequent images becomes known as well as the corresponding differences in the position and aim of the camera on the smart phone. Aside from doing the triangulation on each of the targeted features in the subsequent images, the SLAM system also does a comparison between the differences in each feature's relationship to other features in the image. The result is that the smart phone has different views of the target object, knows the approximate angles of focus, knows the distance between the positions used by the camera, and is tracking known features and their relationships to each other. From this, the smart phone can get a very good approximation of how each feature is positioned in real space with relation to the other features, essentially producing a three-dimensional mapping of targeted points in the observed space. Once a three-dimensional mapping is complete, the two-dimensional images can be wrapped onto the three-dimensional mapping by matching corresponding image points. The result is a virtual three-dimensional model.

Many systems exist for creating stereoscopic and auto-stereoscopic images from a virtual three-dimensional model. However, most prior art systems create three-dimensional images that appear to exist behind or below the plane of the electronic screen on which the images are viewed. It is far more difficult to create 3D effects that cause an image to stand above, or in front of, the screen on which it is viewed. In order to create a virtual image that appears to be above or in front of a display, sophisticated adjustments have to be incorporated into the creation of the image. In the prior art, creating such 3D effects is primarily accomplished by imaging the virtual 3D model from stereoscopic viewpoints. The parallax between the stereoscopic viewpoints is altered or the viewpoints are shifted to add 3D effects. Only minor adjustments are made to the virtual 3D model prior to imaging.

It has been discovered that 3D images of virtual 3D models can be created more realistically and with more clarity by creatively altering the 3D model in addition to controlling the imaging camera viewpoints. The improved technique represents an advancement in the art as described and claimed below.

SUMMARY OF THE INVENTION

The present invention is a system, method and software for producing imagery to be viewed on a display medium. The imagery contains aspects that appear to be three dimensional and embody enhanced 3D effects when viewed using the display medium.

A camera is provided at a physical scene. The camera can be monoscopic or stereoscopic. The camera has a signal emitter and a signal detector that are used both for autofocusing and/or depth mapping. The camera is used to take a first image of the physical scene from a first perspective. In addition to the first image, a first set of depth mapping data is obtained that corresponds to the first image. The camera is used to take a subsequent image of the physical scene from a subsequent perspective, wherein a subsequent set of depth mapping data is obtained that corresponds to the subsequent image.

The first set of depth mapping data and the subsequent set of depth mapping data are used to generate a disparity mapping. A virtual 3D model that corresponds to at least some of the elements contained within the physical scene is created from the disparity mapping. Once the virtual 3D model is generated, it is imaged from stereoscopic viewpoints to obtain images that can be viewed as three-dimensional. The images are displayed on the display medium, wherein the enhanced 3D effects added to the virtual 3D model cause aspects of the virtual 3D model to appear to extend above, or in front of, the display medium, depending upon the orientation of the display.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention system, method and software can be embodied in many ways, the embodiment illustrated shows the system, method and software being used to create a virtual 3D image of a dinosaur. This embodiment is selected for the purposes of description and explanation. The dinosaur is intended to represent any object, real or imaginary, that can be imaged and presented through the system. The illustrated embodiment is purely exemplary and should not be considered a limitation when interpreting the scope of the appended claims.

Figure 1:
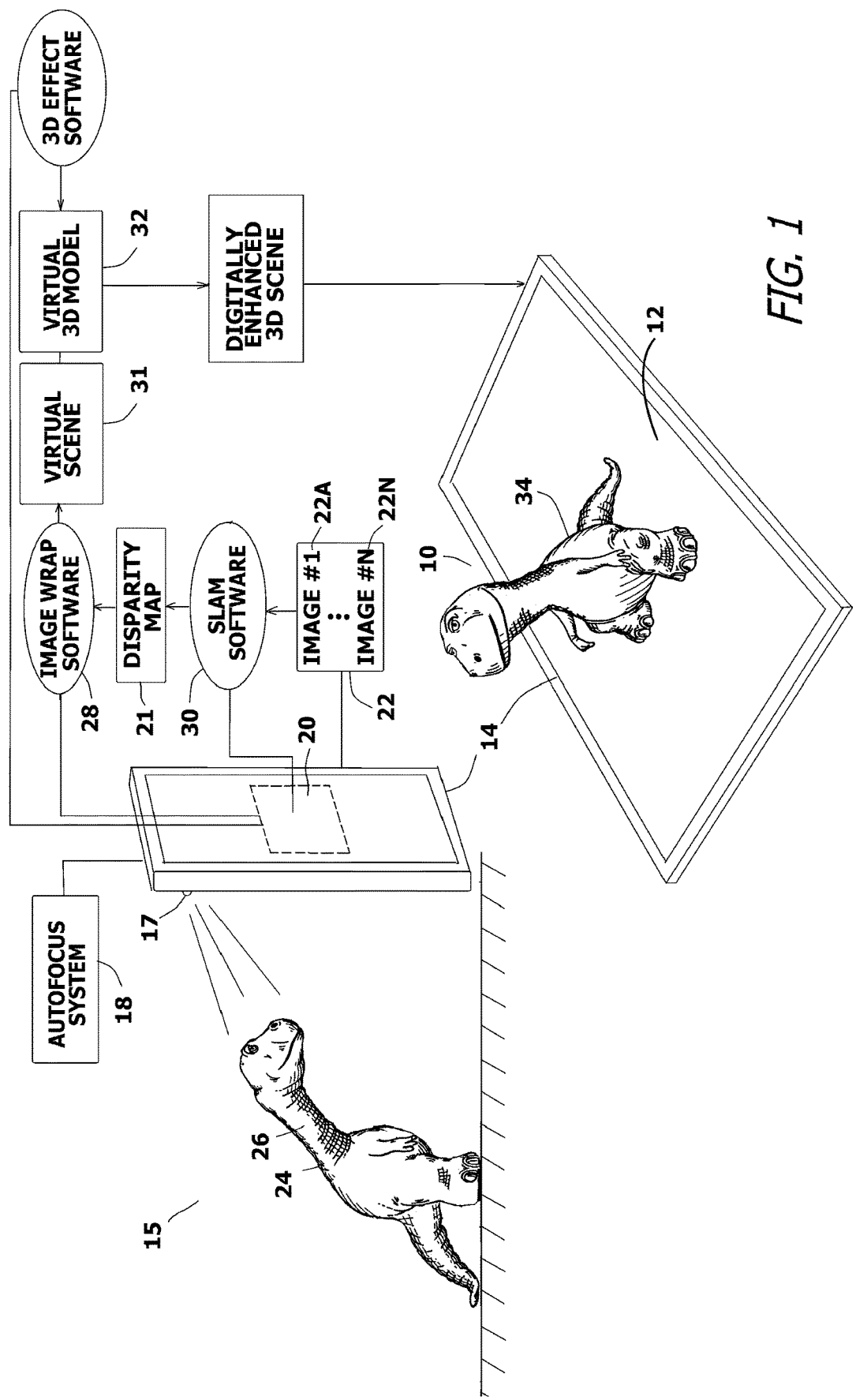
FIG. 1 shows system hardware needed to create and utilize the present invention.

Referring to FIG. 1, it will be understood that the present invention is used to produce production imagery 10 with enhanced 3D effects. The production imagery 10 is viewed on a display medium, such as a printed page or the illustrated example of a display 12 of an electronic device 14. The production imagery 10 can be a stationary image or a video. Regardless, the production imagery 10 appears to have aspects that are three-dimensional when viewed on the display 12. Furthermore, at least some of the production imagery 10 embody enhanced 3D effects that cause aspects of the production imagery 10 to appear to extend vertically above, or in front of, the surface plane of the display 12. If the electronic device 14 is a traditional LED or LCD display, the production imagery 10 will have to be viewed with 3D glasses in order to observe the three-dimensional effects in the production imagery 10. Likewise, if production imagery 10 is printed on a paper medium, the production imagery 10 will have to be viewed with 3D glasses. Alternatively, if the electronic device 14 has an autostereoscopic display, then the enhanced 3D effects in the production imagery 10 can be observed with the naked eye.

The production imagery 10 that contains enhanced 3D effects starts as a physical scene 15 that is captured by a camera 17. The camera 17 can be a monoscopic camera or a stereoscopic camera. The camera has an autofocus system 18 that emits signals and receives reflections of those signals to determine distances to objects in front of the camera 17. The camera 17 is preferably embodied into the handheld electronic device 14, in the form of a smart phone or tablet computer. The handheld electronic device 14 has its own processor 20 and runs an autofocus system 18 that uses a time of flight and/or a structured light subsystem to focus the camera 17. The time of flight and/or structured light autofocus system emit and detect signals, such as infrared light or ultrasonic signals from the handheld electronic device 14. The camera 17 is used to take more than one two-dimensional images 22 of the physical scene 15. This can be achieved using a stereoscopic camera, wherein two images are obtained at the same time. With a monoscopic camera, the position of the camera 17 and/or the position of the subject being imaged is moved slightly between each image 22. This relative movement creates an initial image 22A and at least one subsequent image 22N.

The physical scene 15 captured by the camera 17 typically contains a primary subject 24. In the shown example, the primary subject 24 is a toy dinosaur 26. However, it will be understood that any subject or collection of subjects can be imaged. Upon imaging, the autofocus system 18 of the camera 17 creates depth mapping data for each 2D image 22. A disparity map 21 is then generated by comparing normalized shift values in successive images 22A through 22N. In many modern smart phones, disparity maps 21 are generated using simultaneous localization and mapping (SLAM) software 30 run by its own processor 20. The SLAM software 30 tracks a set of targeted pixel points through the successive camera images 22A-22N and uses these tracks to triangulate positional coordinates in real space. Simultaneously, the estimated positions in real space are used to calculate the camera positions which could have observed them. Accordingly, the optical differences between subsequent images 22A-22N becomes known as well as the corresponding differences in the position and aim of the camera 17 on the handheld electronic device 14. Aside from doing the triangulation on each of the targeted features in the subsequent images 22A-22N, the SLAM software 30 also does a comparison between the differences in each feature's relationship to other features in the images 22. From this, the handheld electronic device 14 can generate a good approximation of how the primary subject 24 is positioned in real space with relation to the other aspects of the scene being imaged. This enables the SLAM software 30 to produce a three-dimensional disparity map 21 of targeted points in the observed space. Once the three-dimensional disparity map 21 is complete, one or more images 22 can be wrapped around the three-dimensional disparity map 21 using available image wrapping software 28. This is accomplished by matching points on the 2D images 22 to the corresponding image points on the three-dimensional disparity map 21 produced by the SLAM software 30. The result is a virtual dinosaur modeling 34 that represents the original toy dinosaur 26.

Figure 2:
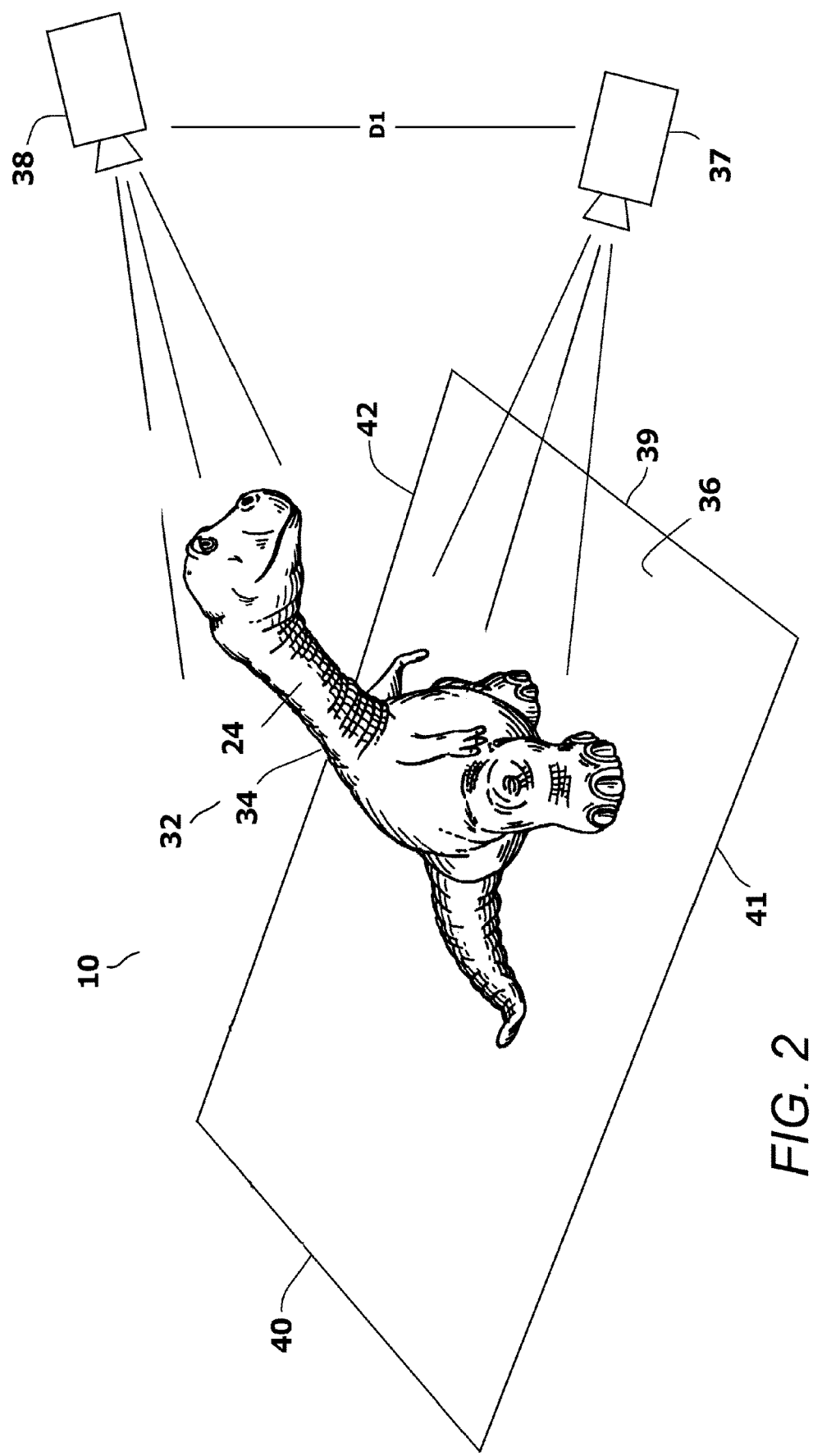
FIG. 2 is a perspective view of an exemplary embodiment of a virtual scene.
Figure 3:
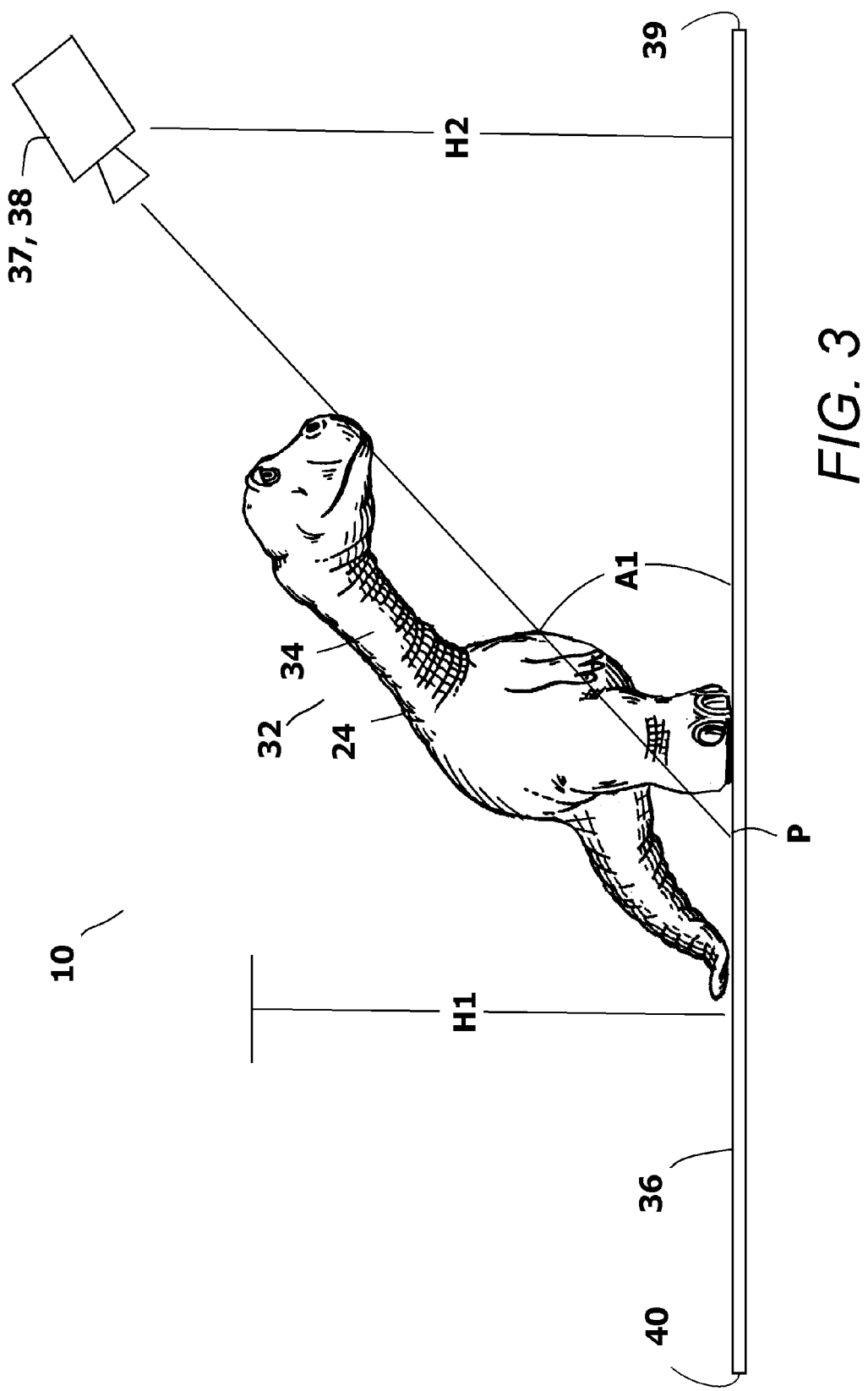
FIG. 3 is a side view of the virtual scene of FIG. 2.

Referring to FIG. 2 and FIG. 3 in conjunction with FIG. 1, an exemplary virtual scene 31 is shown. The virtual scene 31 contains all the elements that were originally imaged in the physical scene 15. The virtual scene 31 typically contains a primary subject 24. The primary subject 24 is often the element within the virtual scene 31 that is used to create a virtual 3D model 32. In the shown example, the primary subject 24 is a dinosaur modeling 34 that corresponds to the imaged toy dinosaur 26. A reference plane 36 is defined within the virtual scene 31. The reference plane 36 can be any plane from which aspects of the dinosaur modeling 34 are to appear above and/or below. In the shown embodiment, the reference plane 36 is oriented with the ground upon which the dinosaur modeling 34 stands. The reference plane 36 of the virtual scene 31, when displayed on an electronic display 12, will be oriented along the plane of the electronic display 12. As such, when the virtual scene 31 is converted into the production imagery 10, any aspect of the dinosaur modeling 34 imaged above the reference plane 36 will project forward and appear to extend out in front of the display 12 or above the display 12, depending on the orientation of the display 12. Conversely, any aspect of the dinosaur modeling 34 imaged below the reference plane 36 will appear to be rearwardly projected and will appear below or behind the plane of the display 12, when the production imagery 10 is viewed.

If the production imagery 10 is to be printed, then the reference plane 36 is selected to correspond with the plane of the paper upon which the production imagery 10 is printed.

Once the elements within the virtual scene 31 to be modeled are selected, a virtual 3D model 32 is generated. Stereoscopic views are taken of the virtual 3D model 32 using virtual camera viewpoints. The stereoscopic views are taken from a virtual left camera viewpoint 37 and a virtual right camera viewpoint 38. The distance D1 between the virtual camera viewpoints 37, 38 and the angle of elevation A1 of the virtual camera viewpoints 37, 38 are dependent upon the scope of the virtual 3D model 32. The virtual 3D model 32 is created to be shown on an electronic display 12. Most electronic displays are rectangular in shape, having a width that is between 50% and 80% of the length. Accordingly, the virtual 3D model 32 is created within boundaries that make the virtual 3D model 32 appropriate in size and scale for a typical electronic display 12. The boundaries include a front boundary 39, a rear boundary 40, and two side boundaries 41, 42. Any production imagery 10 created from the virtual 3D model 32 must exist within the boundaries 39, 40, 41, 42 in order to be seen.

A rear image boundary 40 is set for the production imagery 10. All visual aspects in the virtual scene are to appear forward of the rear image boundary 40. The dinosaur modeling 34 has a height H1. The virtual camera viewpoints 37, 38 are set to a second height H2. The second height H2 is a function of the object height H1 and the rear image boundary 40. The second height H2 of the virtual camera viewpoints 37, 38 is high enough so that the top of the dinosaur modeling 34, as viewed from the virtual camera viewpoints 37, 38, does not extend above the rear image boundary 40. The elevation angle of the virtual camera viewpoints 37, 38 and the convergence angle of the camera viewpoints 37, 38 have a direct Pythagorean relationship that depends upon the scene boundaries 39, 40, 41, 42 and height H1 of the dinosaur modeling 34 as the primary subject 24.

The virtual camera viewpoints 37, 38 can be adjusted to have parallax angles so that the virtual camera viewpoints 37, 38 intersect at the reference plane 36. That is, the two virtual camera viewpoints 37, 38 achieve zero parallax at the reference plane 36. The convergence point P is preferably selected to correspond to a point near the bottom and rear of the dinosaur modeling 34 as the primary subject 24, should the primary subject 24 be resting on the reference plane 36. For example, in the shown embodiment, the reference plane 36 corresponds to the ground upon which the dinosaur modeling 34 stands. The virtual camera viewpoints 37, 38 are directed to the ground just below the rear of the dinosaur modeling 34. The angles of the virtual camera viewpoints 37, 38 are adjusted on a frame-by-frame basis as the dinosaur modeling 34 as the primary subject 24 moves relative to the reference plane 36.

In an alternate setup, the virtual camera viewpoints 37, 38 can be directed in parallel, wherein both virtual camera viewpoints are focused on the reference plane 36. That is, the two virtual camera viewpoints 37, 38 are focused in the same plane, but are parallel. Accordingly, there is no point of convergence.

Figure 4:
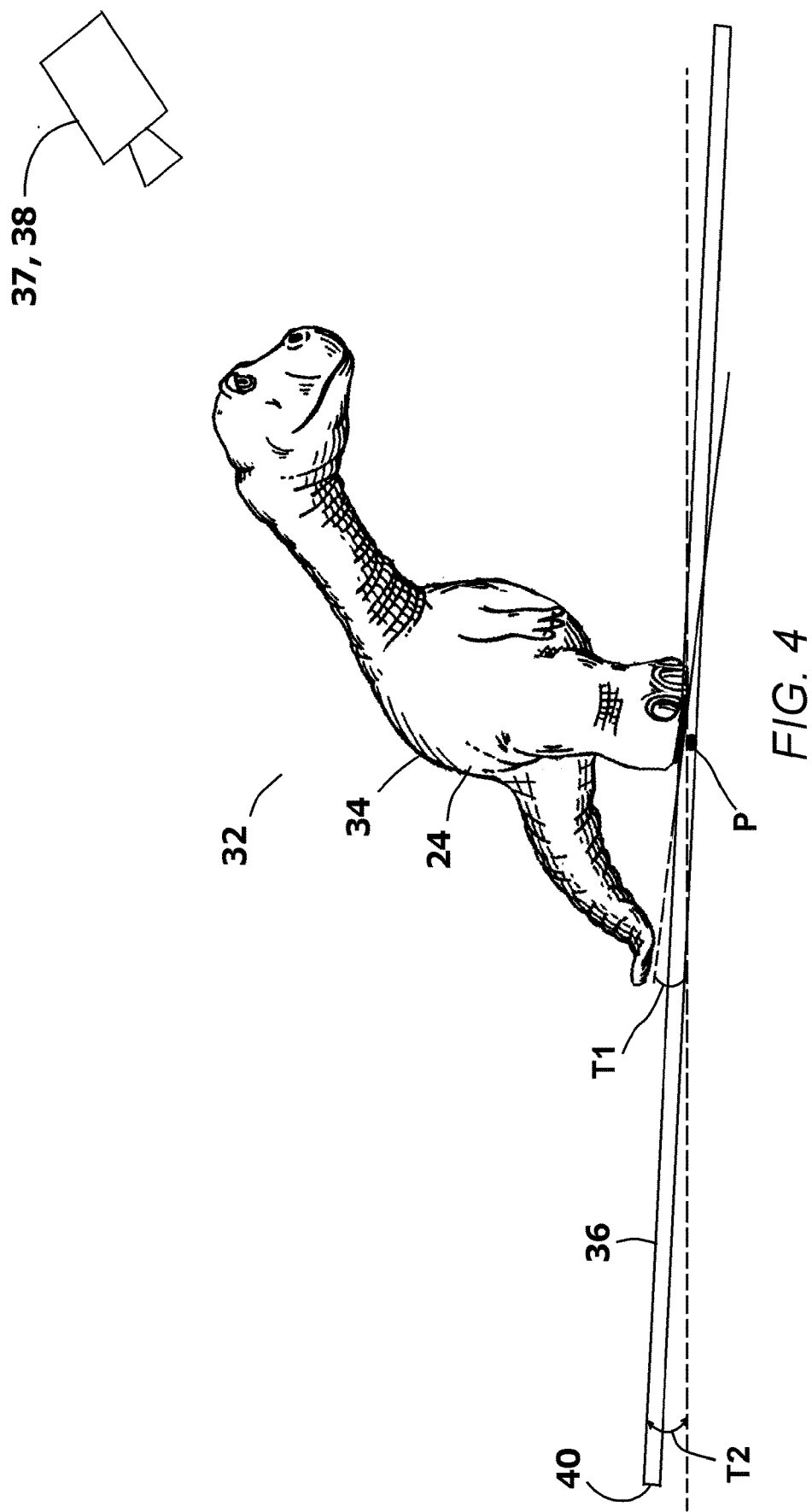
FIG. 4 is a side view showing tilt digital modifications made to the virtual scene shown in FIG. 3.

Enhanced 3D effects are added to the virtual 3D model 32. The enhanced 3D effects are created by altering the virtual 3D model 32 rather than by altering the virtual camera viewpoints 37, 38. Referring to FIG. 4 in conjunction with FIG. 3, it can be explained that the virtual 3D model 32 is not merely imaged from the camera viewpoints 37, 38.

Rather, prior to or after the imaging of the virtual 3D model 32, the virtual 3D model 32 is digitally manipulated in various manners that are beneficial to the images that will be obtained. The digital manipulations include, but are not limited to:

i. tilt manipulations of the reference plane of the imaged scene;
    ii. tilt manipulations of the primary and secondary objects in the imaged scene;
    iii. bend manipulations;
    iv. taper manipulations; and
    v. stretch manipulations.

The digital manipulations that are used depend upon the details of the subjects being imaged.

FIG. 4 illustrates the possible tilt manipulations that can be used. In one tilt manipulation, the dinosaur modeling 34 as the primary subject 24 can be digitally tilted toward or away from the direction of the virtual camera viewpoints 37, 38. The preferred tilt angle is generally between 1 degree and 20 degrees from the original orientation.

In a second tilt manipulation, the whole of the reference plane 36 can be tilted toward or away from the virtual camera viewpoints 37, 38. The preferred tilt angle A2 is generally between 1 degree and 20 degrees from the horizontal, depending upon the final perceived height of the primary subject 24.

Using a point P under the primary subject 24 as a fulcrum point, the reference plane 36 can be digitally and/or physically manipulated to tilt forward or backward. The tilt angle T2 of the reference plane 36 and the tilt angle T1 of the primary subject 24 are independent of each other. The tilting of the reference plane 36 changes the position of the rear image boundary 40 relative to the perceived position of the primary subject 24. This enables the height of the primary subject 24 to be increased proportionately within the confines of the Pythagorean relationship.

Figure 5:
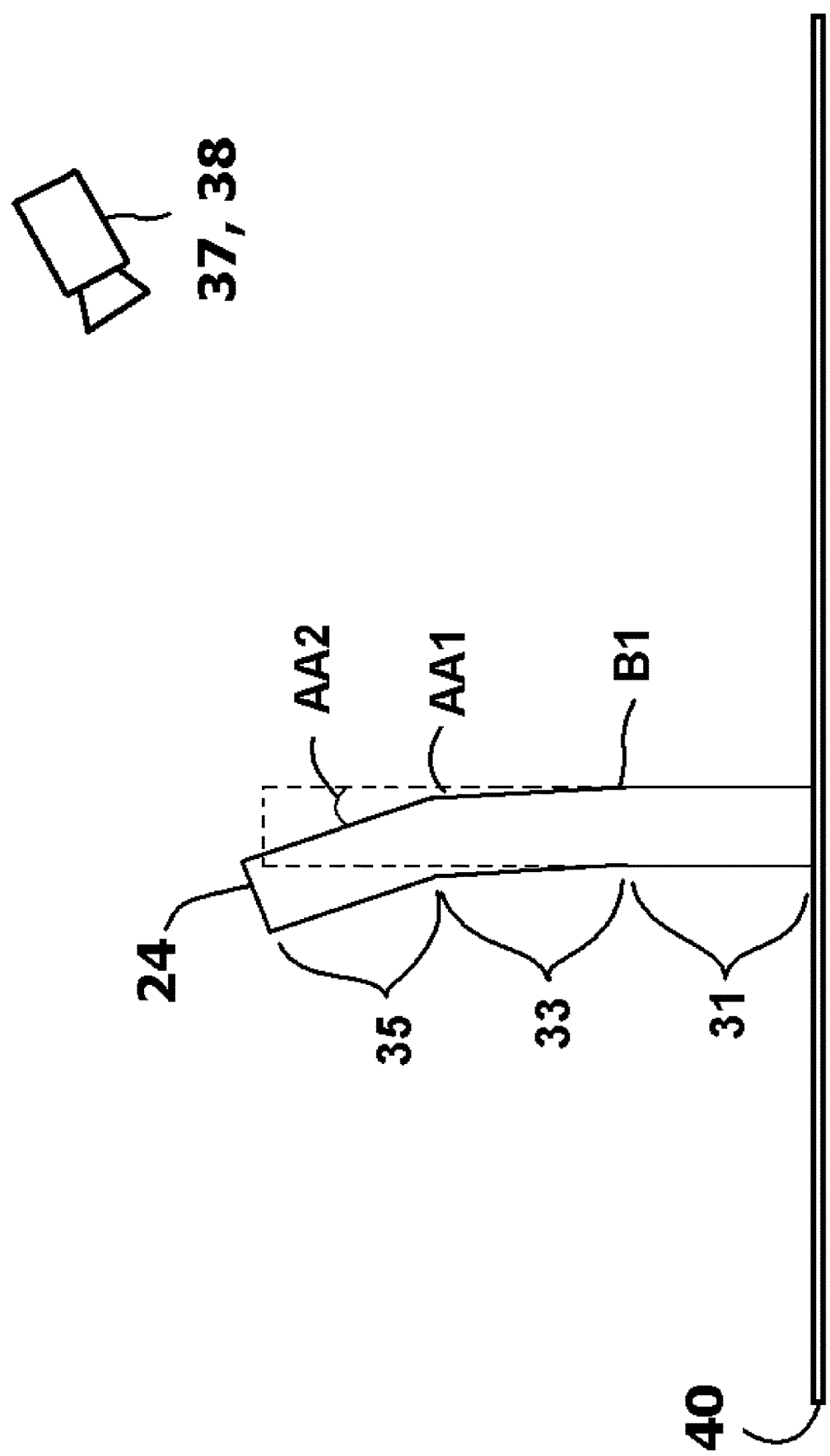
FIG. 5 is a side view showing bend digital modifications made to the virtual scene.

Referring to FIG. 5, in conjunction with FIG. 3 and FIG. 1, a preferred bend manipulation is explained. In FIG. 5, the primary subject 24 is shown as a rectangle, rather than a dinosaur modeling, for ease of explanation. A bend in the complex shape of a dinosaur would be difficult to perceive. A bend point B1 is selected along the height of the primary subject 24. The bend point B1 is between ⅓ and ⅔ the overall height of the primary subject 24. The primary subject 24 is also divided into three regions 31, 33, 35 along its height. In the first region 31, the primary subject 24 is not manipulated. In the second region 33, no manipulation occurs until the bend line B1. Any portion of the primary subject 24 above the bend line B1 and within the second region 33 is digitally tilted by a first angle AA1. In the third region 35, the primary subject 24 is tilted at a second angle AA2, which is steeper than the first angle AA1. The first angle AA1 and the second angle AA2 are measured in relation to an imaginary vertical plane that is parallel to the vertical plane in which the virtual camera viewpoints 37, 38 are set. The result is that the imagery 10 can be made larger and taller without extending above the rear image boundary 40. When viewed from the perspective of the virtual camera viewpoints 37, 38, the primary subject 24 appears taller and has a more pronounced forward or vertical projection.

Figure 6:
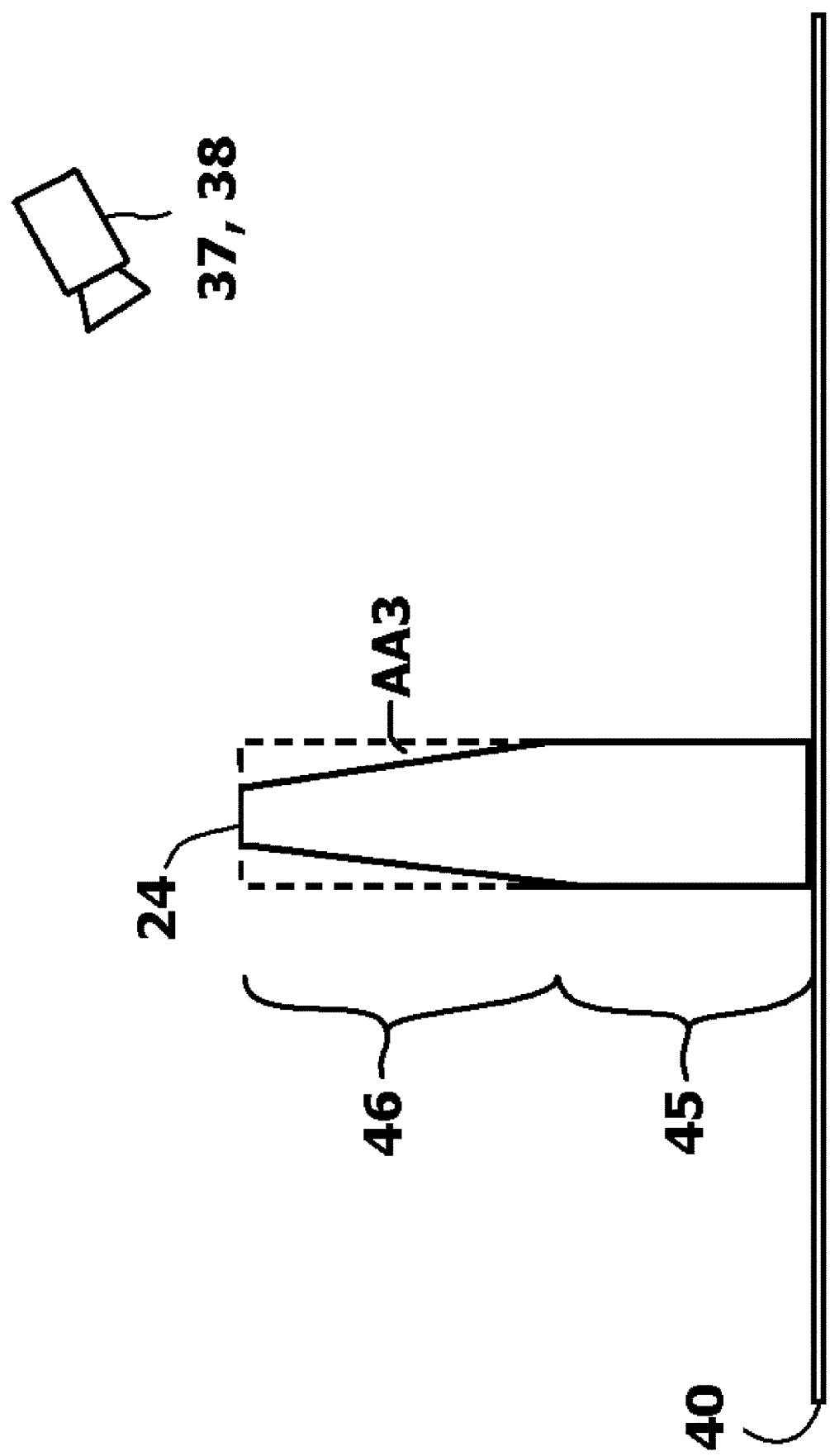
FIG. 6 is a front view showing taper digital modifications made to the virtual scene.

Referring to FIG. 6, in conjunction with FIG. 1 and FIG. 3, a preferred taper manipulation is explained. Again, the primary subject 24 is shown as a representative rectangle, rather than a dinosaur for ease of explanation. The primary subject 24 is divided into regions 45, 46 along its height. In the first region 45, the primary subject 24 is not manipulated. In the second region 46, the primary subject 24 is reduced in size using a taper from front to back of an angle AA3 of between 1 degree and 25 degrees. The point where the taper begins is positioned between ⅓ and ⅔ up the height of the primary subject 24. The result is that the imagery 10 can be made wider without extending beyond the side image boundaries 41, 42. When viewed, the primary subject 24 appears taller and has a more pronounced forward or vertical projection.

Figure 7:
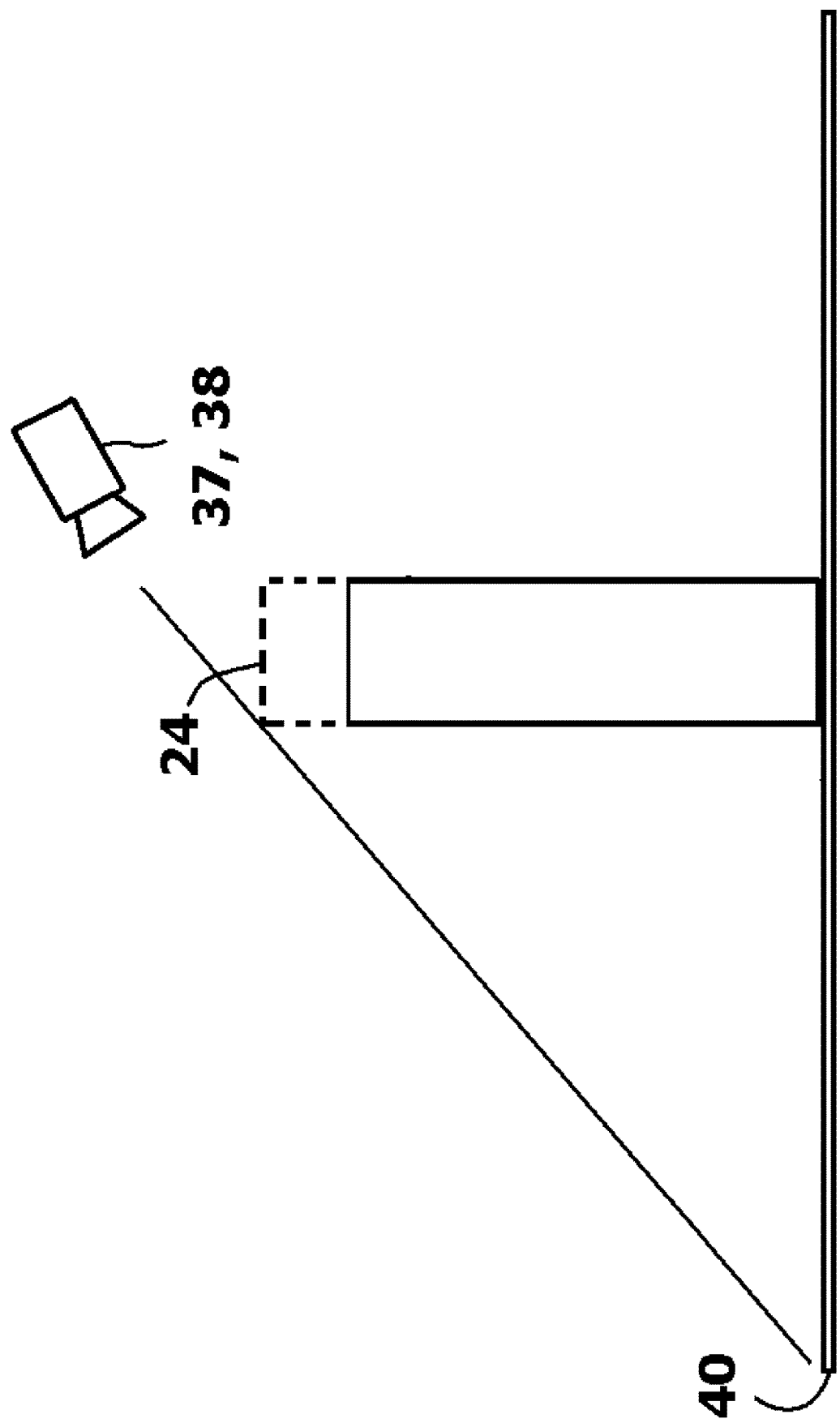
FIG. 7 is a side view showing stretch digital modifications made to the virtual scene.

Referring to FIG. 7 in conjunction with FIG. 1 and FIG. 2, a preferred stretch manipulation is explained. Again, the primary subject 24 is shown as a representative rectangle, rather than a dinosaur modeling for ease of explanation. There is an imaginary line 47 that extends from the virtual camera viewpoints 37, 38 to the rear boundary 40. This imaginary line 47 represents the upper limit of what can be viewed with enhanced 3D effects. The various subjects, including the primary subject 24 have heights that may not reach the imaginary line 47. If the height of a subject, such as the primary subject 24, is below the imaginary line 47, then the height of the primary subject 24 can be stretched vertically until it approaches the height of the imaginary line 47. The result is that all or some of the imaged subjects can be made taller without extending beyond the image boundaries. When viewed, the primary subject 24 appears taller and has a more pronounced forward or vertical projection.

Figure 8:
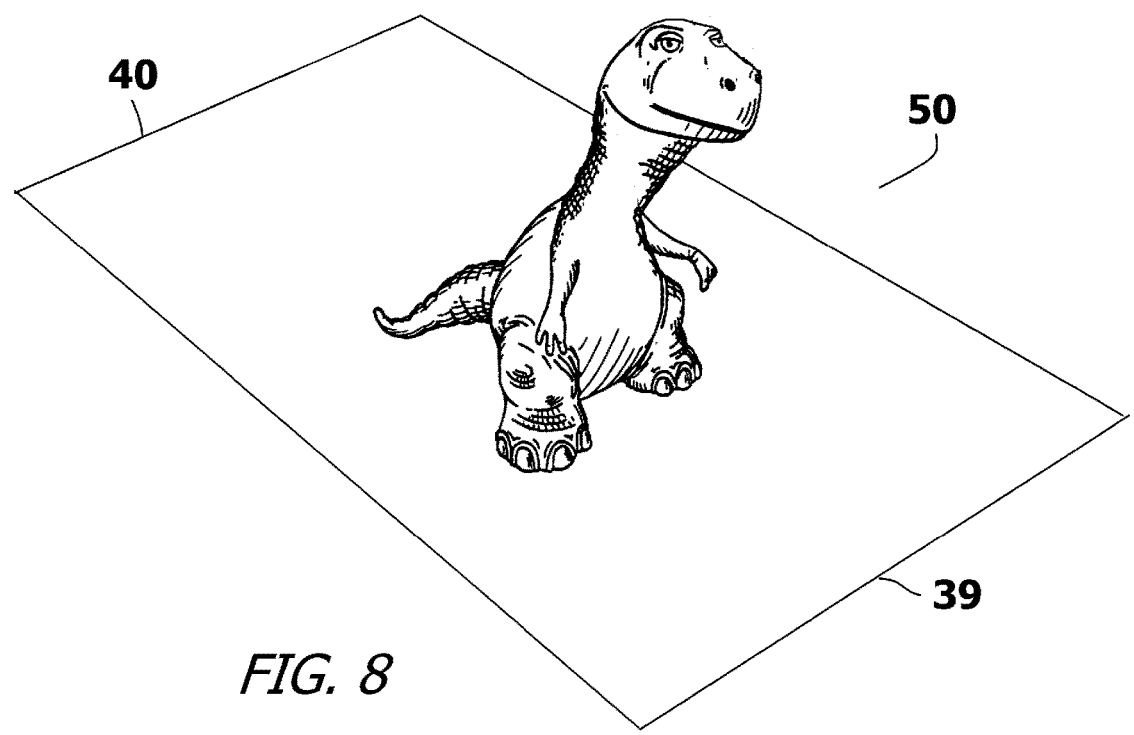
FIG. 8 and FIG. 9 show left and right stereoscopic images, respectively, of the virtual scene.
Figure 9:
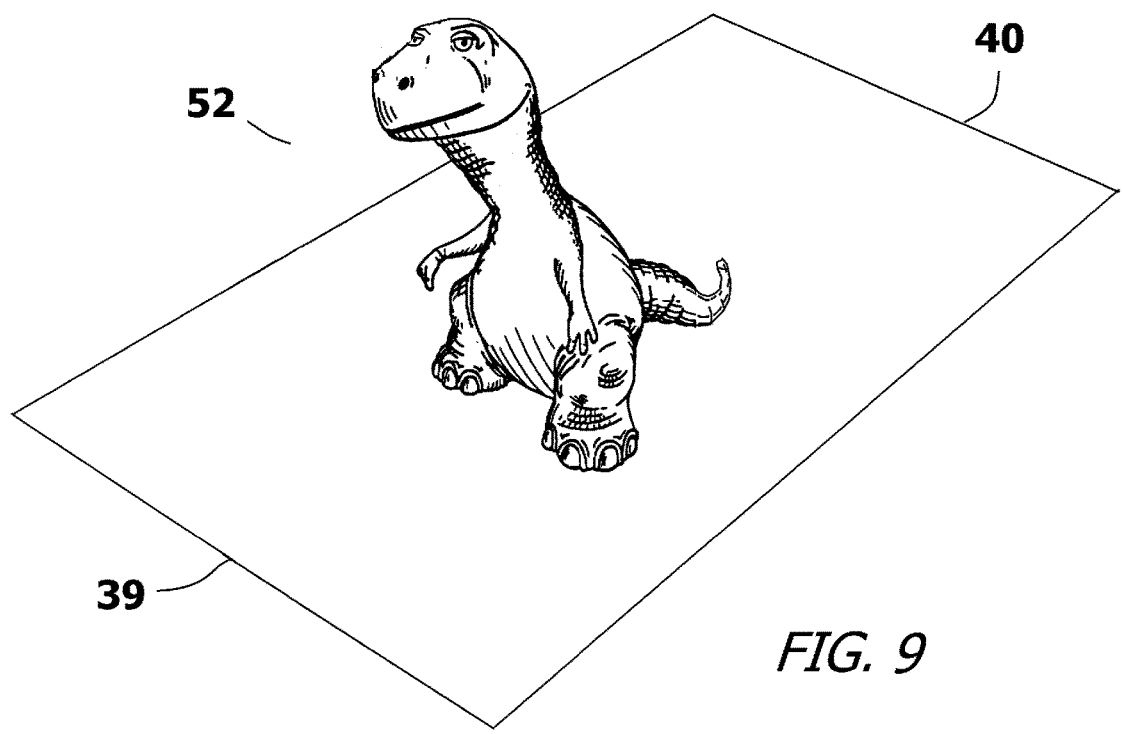

Once the virtual 3D model is digitally adjusted in one or more of the manners described, two images are taken from the virtual camera viewpoints. Referring to FIG. 8 and FIG. 9 in conjunction with FIG. 1, it can be seen that the two images 50, 52 are stereoscopic, with one being the left camera image 50 (FIG. 8) and one being the right camera image 52 (FIG. 9). Each stereoscopic image 50, 52 has a fading perspective due to the angles of the virtual camera viewpoints 37, 38. This causes the front image boundary 39 to appear to be wider than the rear image boundary 40.

Figure 10:
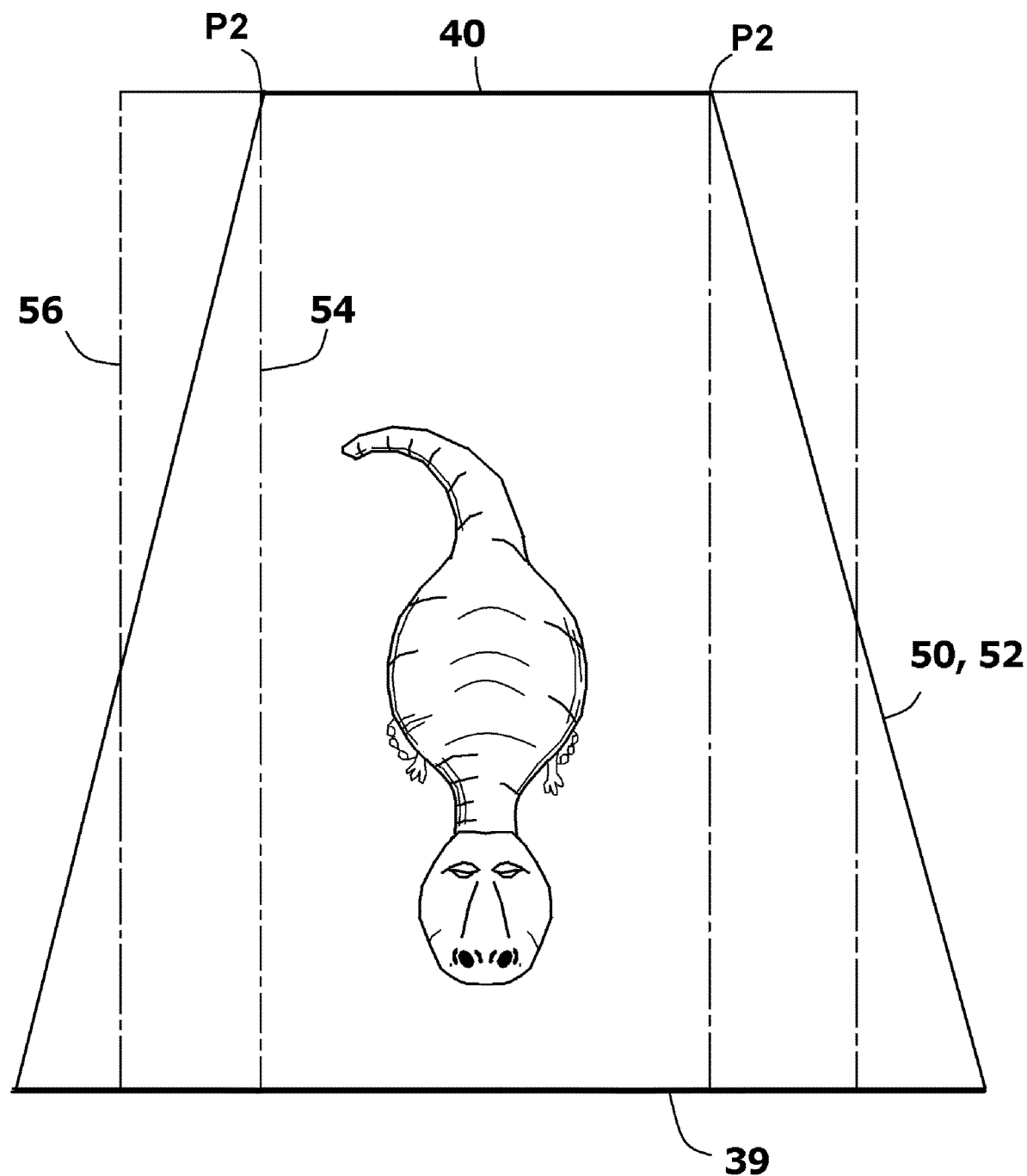
FIG. 10 is a top view of the stereoscopic images showing the superimposition of guidelines.

Referring to FIG. 10, a top view of one of the stereoscopic images 50, 52 from FIG. 8 or FIG. 9 is shown. Although only one of the stereoscopic images is shown, it will be understood that the described process is performed on both of the stereoscopic images. Thus, the reference numbers 50, 52 of both stereoscopic images are used to indicate that the processes affect both.

Temporary reference guides are superimposed upon the stereoscopic images 50, 52. The reference guides include a set of inner guidelines 54 and a set of outer guidelines 56. The inner guidelines 54 are parallel lines that extend from the rear image boundary 40 to the front image boundary 39. The inner guidelines 54 begin at points P2 where the stereoscopic images 50, 52 meet the rear boundary line 40. The outer guidelines 56 are also parallel lines that extend from the rear image boundary 40 to the front image boundary 39. The position of the outer guidelines 56 depends upon the dimensions of the electronic display 12 upon which the production imagery 10 is to be displayed. The width between the outer guidelines 56 corresponds to the pixel width of the electronic display 12 to be used.

Figure 11:
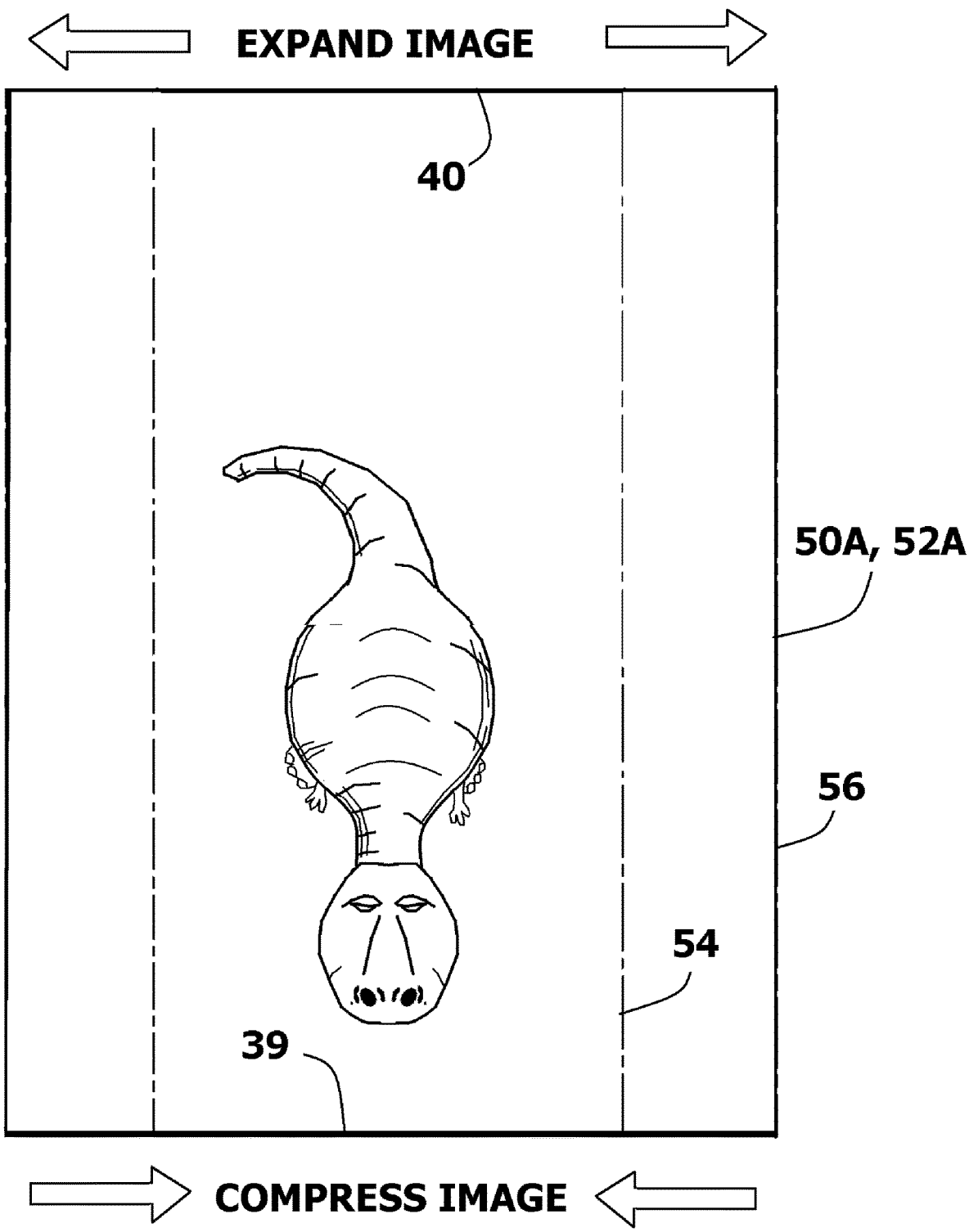
FIG. 11 shows a digitally corrected stereoscopic image created using the guidelines previously shown in FIG. 10.

Referring to FIG. 11 in conjunction with FIG. 10, it can be seen that the stereoscopic images 50, 52 are digitally altered to fit within the parameters of the outer guidelines 56. As such, the stereoscopic images 50, 52 are widened toward the rear image boundary 40 and compressed toward the front image boundary 39. This creates corrected stereoscopic images 50A, 52A of FIG. 12. The inner guidelines 54 remain on the corrected stereoscopic images 50A, 52A.

Figure 12:
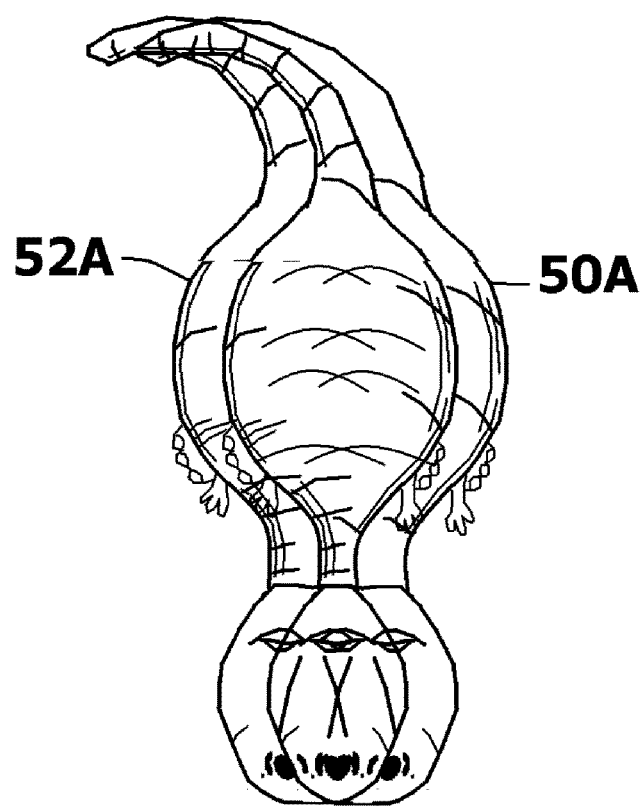
FIG. 12 shows a final image with left and right stereoscopic images superimposed.

Referring to FIG. 12 in conjunction with FIG. 11, the corrected left and right stereoscopic images 50A, 52A are superimposed. The inner guidelines 54 from both corrected stereoscopic images 50A, 52A are aligned. Once alignment is achieved, the inner guidelines 54 are removed. This creates a final image 59. Depending upon how the final image 59 is to be viewed, the corrected stereoscopic images 50A, 52A can be prepared for any type of stereoscopic or auto-stereoscopic viewing. In this manner, when the final image is viewed, it will appear to be three-dimensional.

Figure 13:
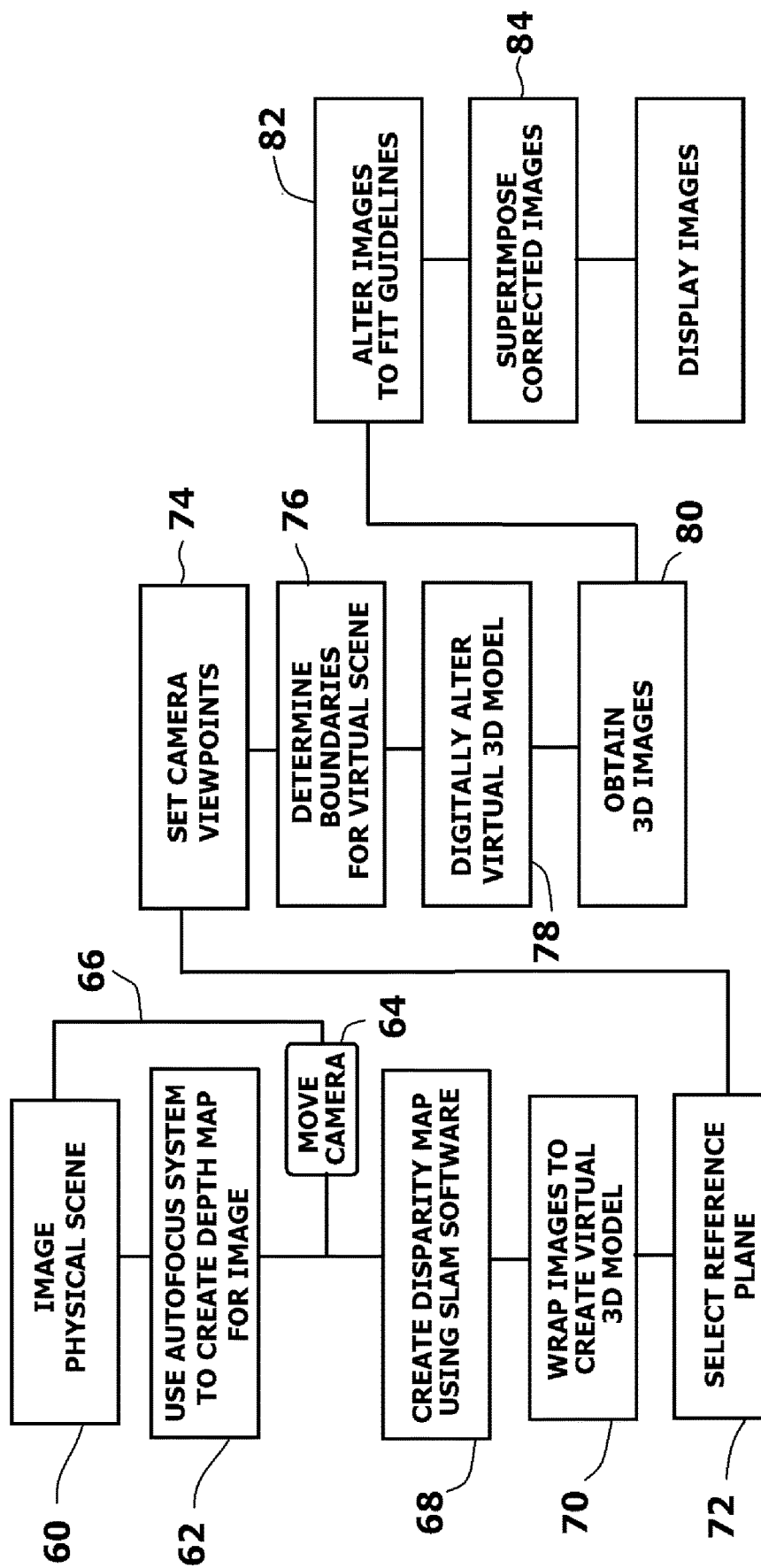
FIG. 13 shows a block diagram logic flow for the software methodology utilized by the present invention.

Referring to FIG. 13 in view of all earlier figures, the software methodology for the overall system can now be summarized. As is indicated in Block 60, a physical scene is imaged using the camera 17 on a handheld electronic device 14, such as a smartphone or a tablet computer. Depending upon the type of handheld electronic device 14, the camera 17 may be a monoscopic camera or a stereoscopic camera. The handheld electronic device 14 contains an autofocus system 18. The autofocus system 18 is a time of flight system or a structured light system that adds depth data to the image. See Block 62. The camera 17 is used to take more than one image from different viewpoints. A stereoscopic camera takes two pictures simultaneously. With a monoscopic camera, an initial image is taken, then the camera 17 and/or the camera's subject are moved and a subsequent image is taken. See Block 64 and repeat cycle line 66.

Images from different perspectives are used to create a disparity map using SLAM software. See Block 68. Once the disparity map 21 is created, one or more of the images 22 collected by the camera 17 are then wrapped around the disparity map 21 to create the virtual 3D model 32. See Block 70.

With the virtual 3D model 32 created, a reference plane 36 is selected within the overall virtual scene 31. See Block 72. The virtual camera viewpoints 37, 38 are also positioned. See Block 74. Using the reference plane 36 and the virtual camera viewpoints, the boundaries of the production imagery 10 are then determined. See Block 76.

As is indicated by Block 78, the virtual 3D model 32 is digitally altered to add enhanced 3D effects. The digital alterations can include tilt manipulations, bend manipulations, taper manipulations and stretch manipulations. Once the virtual 3D model is digitally altered, two stereoscopic images 50, 52 are then produced using the altered virtual 3D model. See Block 80. The stereoscopic images 50, 52 are then corrected to fit the border guidelines of the production imagery 10. See Block 82. The corrected stereoscopic images are superimposed to create a final image 59. See Block 84. The final image is presented on the display 12 or printed. The result is a production imagery 10 with elements that will appear to extend above, or in front of, the display medium when viewed by a user.

It will be understood that the embodiment of the present invention that is illustrated and described is merely exemplary and that a person skilled in the art can make many variations to that embodiment. All such embodiments are intended to be included within the scope of the present invention as defined by the appended claims.

What is claimed is:

1. A method of producing virtual imagery to be viewed on a display medium, wherein said virtual imagery contains aspects that appear to be three dimensional when viewed on said display medium, said method comprising:
   providing a camera at a physical scene, wherein said physical scene contains a subject;
   taking a first image of said physical scene with said camera from a first perspective, wherein said camera provides a first set of depth mapping data corresponding to said first image;
   taking a subsequent image of said physical scene with said camera from a subsequent perspective, wherein said camera provides a subsequent set of depth mapping data corresponding to said subsequent image;
   using said first set of depth mapping data and said subsequent set of depth mapping data to generate a disparity mapping;
   creating a virtual 3D model of said physical scene from said disparity mapping;
   selecting a reference plane within said virtual 3D model, wherein said reference plane has peripheral boundaries and said subject is positioned within said peripheral boundaries;
   altering said virtual 3D model by digitally tilting said reference plane about a fulcrum point on said reference plane that is vertically aligned with said subject, therein creating enhanced virtual 3D model;
   imaging said enhanced virtual 3D model from stereoscopic viewpoints to obtain stereoscopic images; and
   displaying said stereoscopic images on said display medium.

2. The method according to claim 1, further including altering said virtual 3D model by digitally bending at least some of said virtual 3D model.

3. The method according to claim 1, further including altering said virtual 3D model by digitally tapering at least some of said virtual 3D model.

4. The method according to claim 1, further including altering said virtual 3D model by digitally stretching at least some of said virtual 3D model.

5. The method according to claim 1, wherein creating a virtual 3D model of said physical scene from said disparity mapping includes wrapping at least one image over said disparity mapping to generate said virtual 3D model, wherein said at least one image is selected from said first image and said subsequent image.

6. The method according to claim 1, further including the step of defining a common set of boundaries for said stereoscopic images.

7. The method according to claim 1, wherein said display medium is an electronic display with a screen and said stereoscopic images are displayed with said reference plane oriented in said screen.

8. The method according to claim 1, wherein said providing a camera includes providing a handheld electronic device that contains both said camera and said display medium.

9. A method of producing imagery to be viewed on a display, wherein at least some of said imagery appears to be three dimensional when viewed on said display, said method comprising:
   utilizing a camera to produce images of a scene with corresponding depth mapping data, wherein said images contain a subject and at least some of said images have differing perspectives of said subject;
   creating a disparity map from said images;
   creating a 3D model from said disparity map;
   selecting a reference plane within said 3D model;
   digitally altering said 3D model by digitally bending said 3D model relative said reference plane where said 3D model corresponds to said subject, therein adding enhanced 3D effects to said 3D model and creating an enhanced 3D model;
   generating a 3D image from said enhanced 3D model;

displaying said 3D image on a display medium, wherein said enhanced 3D effects cause at least some of said 3D image to appear to extend out of said display medium when observed.

10. The method according to claim 9, wherein generating a 3D image from said enhanced 3D model includes obtaining stereoscopic images from said 3D model and superimposing said stereoscopic images to produce said 3D image.

11. The method according to claim 9, wherein digitally altering said 3D model further includes digitally tilting at least some of said 3D model.

12. The method according to claim 9, wherein digitally altering said 3D model further includes digitally tapering at least some of said 3D model.

13. The method according to claim 9, wherein digitally altering said 3D model further includes digitally stretching at least some of said 3D model.

14. The method according to claim 9, wherein creating a 3D model from said disparity map includes wrapping at least one of said images over said disparity map.

15. The method according to claim 9, further including the step of selecting a reference plane within a set of boundaries.

16. The method according to claim 15, wherein said display medium is an electronic display with a screen plane and said 3D image is displayed with said reference plane oriented in said screen plane.

17. The method according to claim 15, wherein displaying said 3D image on a display medium includes displaying said 3D image on a printable medium with a printed surface and said 3D image is displayed with said reference plane oriented in said printed surface.

18. A method of producing imagery to be viewed on a display, wherein at least some of said imagery appears to be three dimensional when viewed on said display, said method comprising:

utilizing a camera to produces images of a scene with corresponding depth mapping data, wherein said images contain a subject and at least some of said images have differing perspectives of said subject;

creating a disparity map from said images;

creating a 3D model from said disparity map;

selecting a reference plane within said 3D model;

digitally altering said 3D model by digitally tapering said 3D model where said 3D model corresponds to said subject, wherein said 3D modeled is tapered as a function of distance from said reference plane, therein adding enhanced 3D effects to said 3D model and creating an enhanced 3D model;

generating a 3D image from said enhanced 3D model;

displaying said 3D image on a display medium, wherein said enhanced 3D effects cause at least some of said 3D image to appear to extend out of said display medium when observed.

* * * * *